(12) United States Patent
Terajima

(10) Patent No.: US 11,500,272 B2
(45) Date of Patent: Nov. 15, 2022

(54) BIAXIAL TILTING DEVICE, CAMERA DEVICE, AND ELECTRONIC APPARATUS

(71) Applicant: New Shicoh Motor Co., Ltd., Zhejiang (CN)

(72) Inventor: Kokichi Terajima, Kanagawa (JP)

(73) Assignee: New Shicoh Motor Co., Ltd., Zhejiang (CN)

( * ) Notice: Subject to any disclaimer, the term of this patent is extended or adjusted under 35 U.S.C. 154(b) by 0 days.

(21) Appl. No.: 17/208,101

(22) Filed: Mar. 22, 2021

(65) Prior Publication Data

US 2021/0341822 A1    Nov. 4, 2021

(30) Foreign Application Priority Data

Apr. 30, 2020   (CN) .......................... 202010362755.1

(51) Int. Cl.
   *G03B 17/56*   (2021.01)
   *G02B 27/64*   (2006.01)
   *F16M 11/12*   (2006.01)

(52) U.S. Cl.
   CPC ......... *G03B 17/561* (2013.01); *F16M 11/123* (2013.01); *G02B 27/646* (2013.01)

(58) Field of Classification Search
   CPC .................................................. F16M 11/123
   See application file for complete search history.

(56) References Cited

U.S. PATENT DOCUMENTS 9,395,551 B2 * 7/2016 Ando .................... G02B 27/646

9,885,942 B2 * 2/2018 Zhao ....................... F16M 11/10
2009/0039734 A1   2/2009 Takahashi et al.
2021/0278688 A1 * 9/2021 Hatano ..................... G03B 5/00

FOREIGN PATENT DOCUMENTS

| CN | 108332023 A | * | 7/2018 | ............ B64D 47/08 |
|---|---|---|---|---|
| JP | H10-090758 | | 4/1998 | |
| JP | 2007-183356 | | 7/2007 | |
| JP | 2009-044856 | | 2/2009 | |
| JP | 2012-244614 | | 12/2012 | |

OTHER PUBLICATIONS

Japanese Office Action dated Jan. 11, 2022 in corresponding Japanese Patent Application No. 2021-045482, and English translation (Year: 2022).*
English language abstract of JP 2012-244614.
English language machine translation of JP 2007-183356.
English language machine translation of JP H10-090758.

* cited by examiner

*Primary Examiner* — Leon W Rhodes, Jr.
(74) *Attorney, Agent, or Firm* — Fildes & Outland, P.C.

(57) ABSTRACT

A biaxial tilting device includes: a frame body; and a tilting and driving mechanism configured to drive a member to be tilted so as to be tilted in the frame body, wherein, in an XYZ orthogonal coordinate system, the frame body includes a first gimbal frame opposed to two of the side surfaces of the member to be tilted, each extending in a Y-Z plane direction, and a second gimbal frame opposed to other two of the side surfaces of the member to be tilted, each extending in an X-Z plane direction, and wherein the first gimbal frame is coupled to an external member, the second gimbal frame is coupled to the member to be tilted in a tillable manner, and the first gimbal frame and the second gimbal frame are coupled to each other in a tiltable manner.

16 Claims, 6 Drawing Sheets

BIAXIAL TILTING DEVICE, CAMERA DEVICE, AND ELECTRONIC APPARATUS

BACKGROUND OF THE INVENTION

The present invention relates to a biaxial tilting device, a camera device, and an electronic apparatus.

There is known an image shooting device for a dashboard camera to be mounted to a vehicle, which includes a camera unit and a holder configured to support the camera unit (Japanese Patent Application Laid-open No. 2012-244614).

A dashboard camera to be mounted to a vehicle includes a camera unit. The camera unit is directly mounted to the vehicle, and hence is liable to be shaken due to vibration and shock, which may be caused while the vehicle is running. As a result, a clear image may not be recorded.

SUMMARY

The present invention has an object to provide a biaxial tilting device, a camera device, and an electronic apparatus, which enable suppression of shaking of a camera unit.

According to one aspect of the present invention, there is provided a biaxial tilting device, including: a frame body provided to be opposed to side surfaces of a tiltable target member across a space; and a tilting and driving mechanism configured to drive the tiltable target member so as to be tilted, wherein, in an XYZ orthogonal coordinate system, the frame body includes: a first gimbal frame opposed to two of the side surfaces of the tiltable target member, each extending in a Y-Z plane direction; and a second gimbal frame opposed to other two of the side surfaces of the tiltable target member, each extending in an X-Z plane direction, and wherein the first gimbal frame is coupled to an external member, the second gimbal frame is coupled to the tiltable target member in such a manner as to be tiltable, and the first gimbal frame and the second gimbal frame are coupled to each other in such a manner as to be tiltable.

Further, it is preferred that the second gimbal frame be coupled to the first gimbal frame through intermediation of first gimbal shafts, each extending along a Y-axis direction, so that the second gimbal frame is tiltable about the first gimbal shafts, and the other two side surfaces of the tiltable target member be connected to the second gimbal frame through intermediation of second gimbal shafts, each extending along an X-axis direction, so that the tiltable target member is tiltable about the second gimbal shafts.

Further, it is preferred that each of the first gimbal frame and the second gimbal frame have an oblong shape having long sides and short sides when viewed in the Z-axis direction, the long sides of the second gimbal frame be located on an inner side of the short sides of the first gimbal frame, the long sides of the first gimbal frame be located on an inner side of the short sides of the second frame, and inner surfaces of the frame body, which correspond to the long sides of the first gimbal frame and the long sides of the second gimbal frame, be directly opposed to the side surfaces of the tiltable target member.

Further, it is preferred that each of the first gimbal frame and the second gimbal frame have cutout portions formed in corners of the oblong shape, and the second gimbal frame is arranged so as to be inverted by 180 degrees about the X axis or the Y axis and is rotated by 90 degrees about the Z axis from an arrangement in which the second gimbal frame is arranged to be directed in the same direction as a direction in which the first gimbal frame is directed, and be then placed on and combined with the first gimbal frame in such a manner that the cutout portions of the second gimbal frame overlap with the corresponding cutout portions of the first gimbal frame.

Further, it is preferred that one of a magnet and a coil, which serves as the tilting and driving mechanism, be arranged on each of the side surfaces of the tillable target member, and another one of the magnet and the coil be arranged on each of inner surfaces of the frame body including the first gimbal frame and the second gimbal frame, which are directly opposed to the side surfaces of the tiltable target member.

Further, it is preferred that the biaxial tilting device further include a turning mechanism configured to pivot the first gimbal frame around the Z axis.

Further, it is preferred that the turning mechanism include a shaft member, which extends in the Z-axis direction, and is configured to support the first gimbal frame, and a bearing configured to support the shaft member.

According to another aspect of the present invention, there is provided a camera device, including: a camera unit corresponding to the tiltable target member; and the biaxial tilting device of any one of the aspects of the above-mentioned invention.

According to another aspect of the present invention, there is provided an electronic apparatus, including the camera device of the above-mentioned invention.

According to the present invention, the biaxial tilting device includes the tilting and driving mechanism configured to drive the finable target member, which corresponds to the camera unit, so as to tilt the tiltable target member. The first gimbal frame is coupled to the external member, and the second gimbal frame is coupled to the tiltable target member in such a manner as to be tiltable. The first gimbal frame and the second gimbal frame are coupled to each other in such a manner as to be tiltable. The configuration described above enables suppression of shaking of the tiltable target member.

DESCRIPTION OF THE EMBODIMENTS

Figure 1:
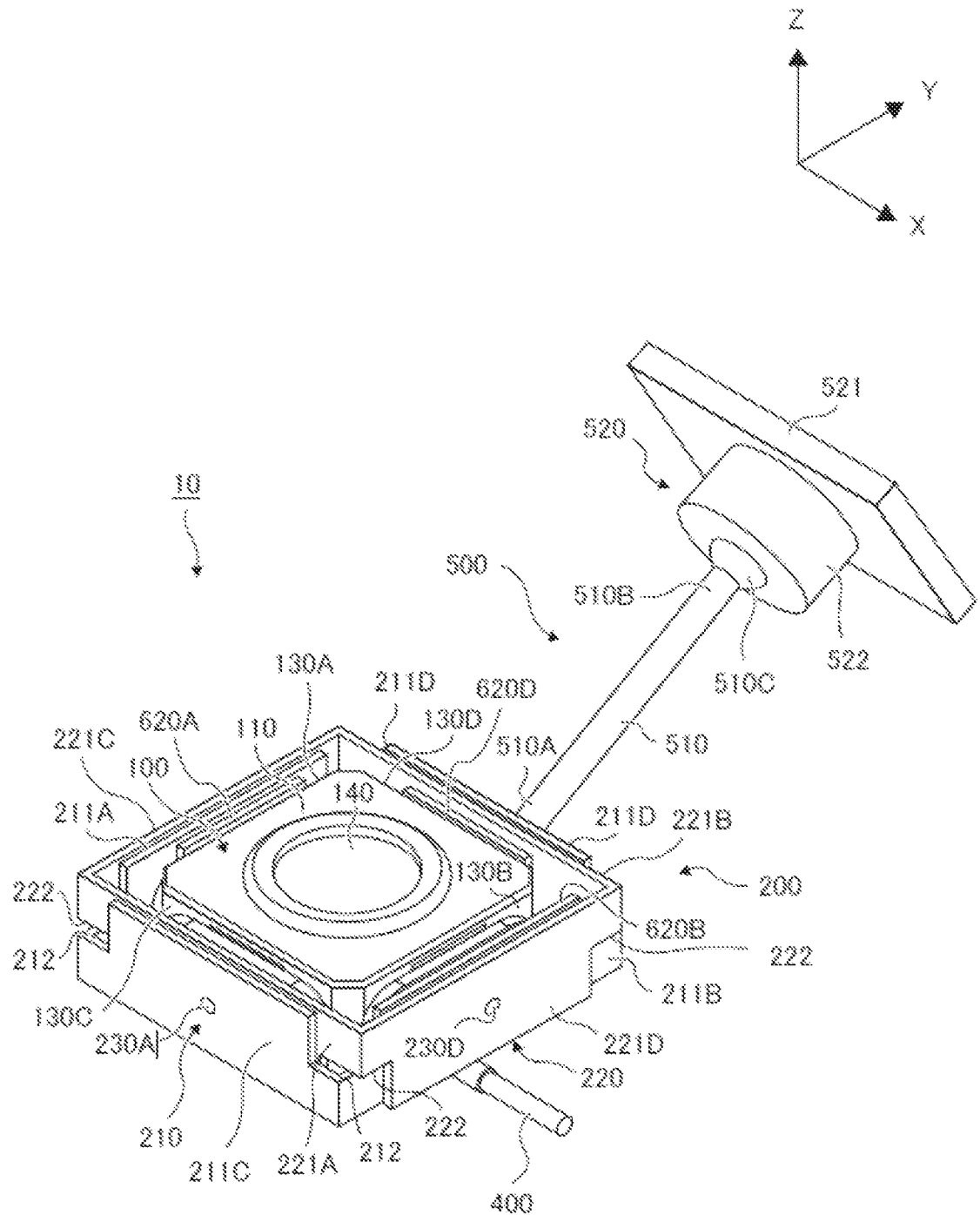
FIG. 1 is an outside perspective view of a dashboard camera according to a first embodiment.
Figure 2:
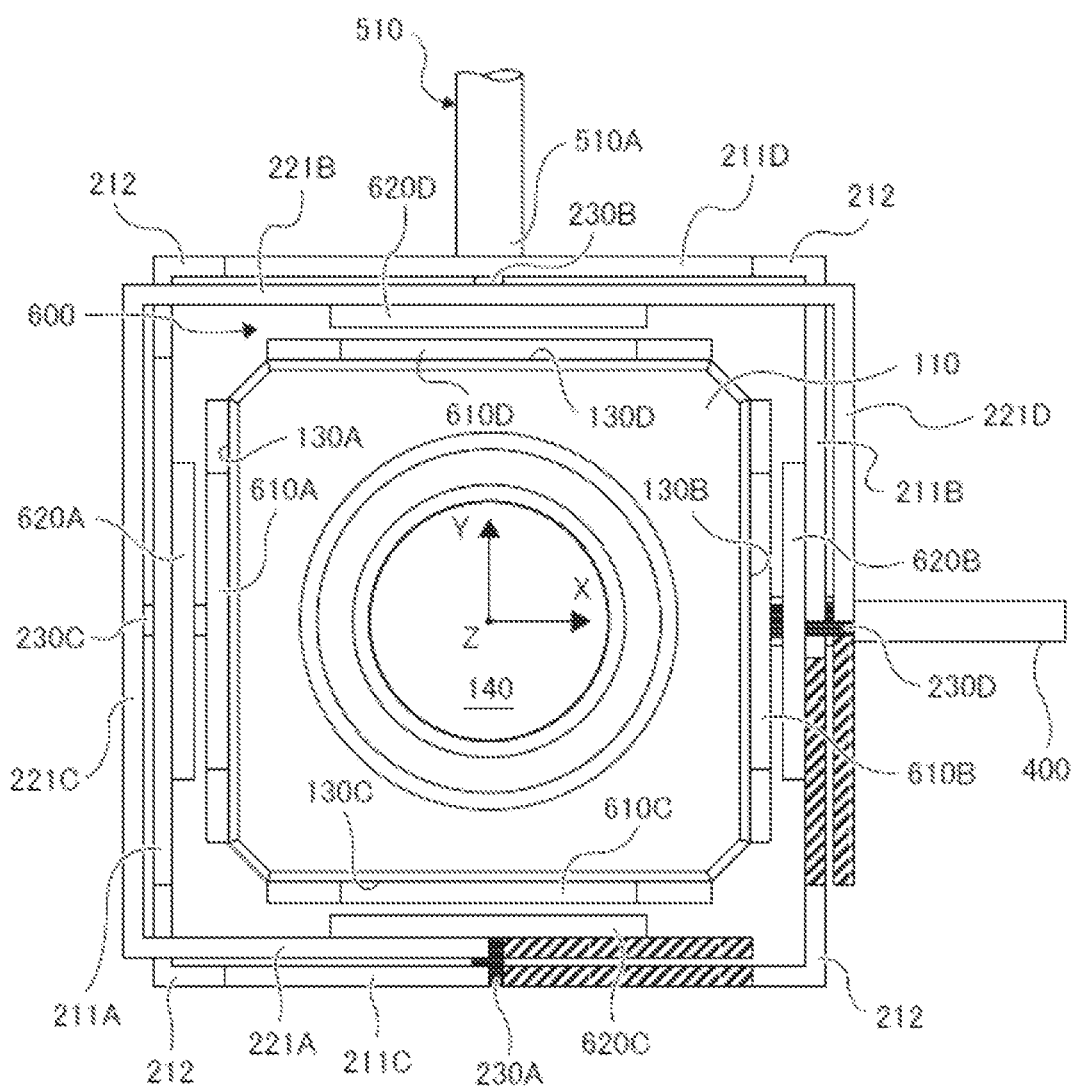
FIG. 2 is a plan view of a main part of the dashboard camera of FIG. 1 when viewed from a front side in a Z-axis direction, which is taken partially in section for visibility of a cross section.
Figure 3:
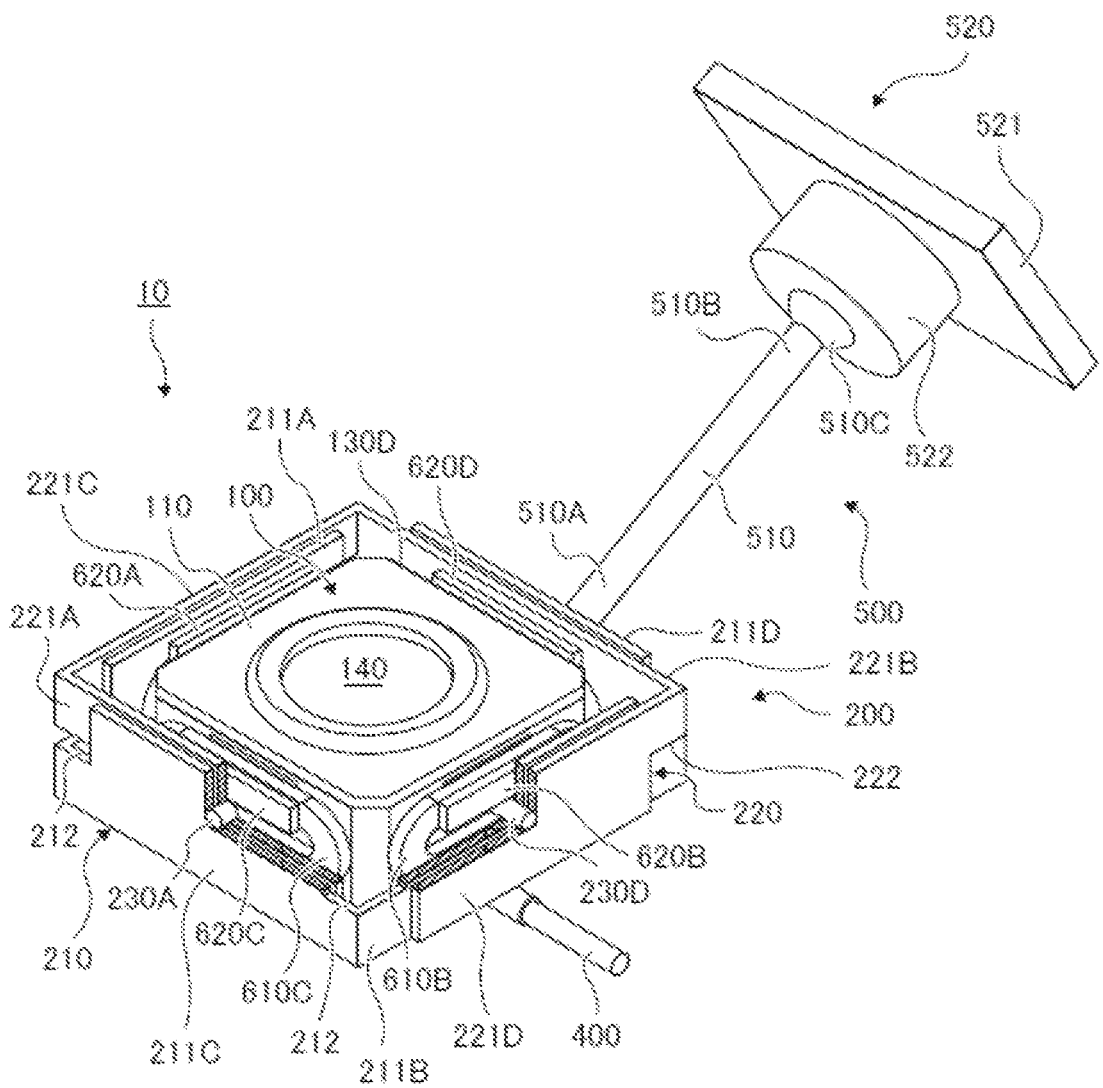
FIG. 3 is an outside perspective view, partially in section, of the dashboard camera of FIG. 2.

Embodiments of the present invention are described with reference to the accompanying drawings. In the embodiments described below, a biaxial tilting device, a camera device, and an electronic apparatus according to the present invention are exemplified. Thus, the present invention is not intended to be limited to the embodiments described below.

First Embodiment

As illustrated in FIG. 1 to FIG. 4, a dashboard camera 10 corresponding to an electronic apparatus according to a first embodiment includes a camera device and a mounting member 500. The camera device includes a camera unit 100 and a biaxial tilting device. The camera unit 100 corresponds to a member to be tilted (a tilted member). The biaxial tilting device is configured to biaxially tilt the camera unit 100. A power cable 400 is connected to the camera unit 100. The biaxial tilting device includes a frame body 200 and a tilting and driving mechanism. The frame body 200 surrounds the camera unit 100. The tilting and driving mechanism is configured to tilt the camera unit 100. The tilting and driving mechanism includes a current supply control unit and a tilting and driving device 600, which are described later.

The camera unit 100 is formed as a box body having a cuboidal shape. The camera unit 100 has a front surface 110, a bottom surface 120, and four side surfaces 130A to 130D. The front surface 110 having a substantially square shape extends in an X-Y plane direction. The bottom surface 120 is parallel to the front surface 110. The front surface 110 and the bottom surface 120 have substantially the same shape and the same dimensions. Each of the front surface 110 and the bottom surface 120 may have an oblong shape. Each of the four side surfaces 130A to 130D has an oblong shape having substantially the same size with a predetermined height in a Z-axis direction and a predetermined length in a Y-axis direction or an X-axis direction. Each of the side surfaces 130A and 130B extends in a Y-Z plane direction, and each of the side surfaces 130C and 130D extends in an X-Z plane direction.

A lens 140 having the Z-axis direction as its optical axis direction is arranged on the front surface 110 of the camera unit 100. Further, an image pickup element (not shown) configured to receive light that is reflected from an object to pass through the lens 140 is arranged in parallel to the lens 140 inside the camera unit 100. The current supply control unit (not shown) configured to supply a current to a coil of the tilting and driving device 600 described later is provided inside the camera unit 100. Further, a recording medium storage portion (not shown) or a video image control unit (not shown) may be provided inside the camera unit 100. The recording medium storage portion is configured to store a recording medium such as an SD card. The video image control unit is configured to process a video image taken by the image pickup element and store the video image in the recording medium.

The frame body 200 includes a first gimbal frame 210 and a second gimbal frame 220. Each of the first gimbal frame 210 and the second gimbal frame 220 is a hollow tubular member having two open ends in the Z-axis direction. The first gimbal frame 210 and the second gimbal frame 220 surround the camera unit 100. The first gimbal frame 210 and the second gimbal frame 220 have substantially the same oblong shape with long sides and short sides when viewed from the Z-axis direction.

The first gimbal frame 210 includes long side plates 211A and 211B and short side plates 211C and 211D. Each of the long side plates 211A and 211B extends in the Y-Z plane direction, and is elongated especially along the Y-axis direction. The long side plates 211A and 211B are directly opposed to the side surfaces 130A and 130B of the camera unit 100 across spaces, respectively. Each of the short side plates 211C and 211D extends in the X-Z plane direction, and is elongated especially along the X-axis direction. A length of each of the short side plates 211C and 211D in the X-axis direction is shorter than a length of each of the long side plates 211A and 211B in the Y-axis direction. A height of each of the long side plates 211A and 211B and the short side plates 211C and 211D in the Z-axis direction is substantially equal to a height of the camera unit 100 in the Z-axis direction.

Further, cutout portions 212 are formed in four corners of the oblong shape of the first gimbal frame 210 when the first gimbal frame 210 is viewed in the Z-axis direction. Each of the cutout portions 212 is formed to extend in a −Z direction from a +Z-direction-side end side of each of the side plates to the vicinity of a center. First magnets 620A and 620B described later are arranged on inner surfaces of the long side plates 211A and 211B of the first gimbal frame 210, respectively.

The second gimbal frame 220 includes long side plates 221A and 221B and short side plates 221C and 221D. Each of the long side plates 221A and 221B extends in the X-Z plane direction, and is elongated especially along the X-axis direction. The long side plates 221A and 221B are directly opposed to the side surfaces 130C and 130D of the camera unit 100 across spaces, respectively. Each of the short side plates 221C and 221D extends in the Y-Z plane direction, and is elongated especially along the Y-axis direction. A length of each of the short side plates 221C and 221D in the Y-axis direction is shorter than a length of each of the long side plates 221A and 221B in the X-axis direction. A height of each of the long side plates 221A and 221B and the short side plates 221C and 221D in the Z-axis direction is substantially equal to a height of the camera unit 100 in the Z-axis direction.

Further, cutout portions 222 are formed in four corners of the oblong shape of the second gimbal frame 220 when the second gimbal frame 220 is viewed in the Z-axis direction. Each of the cutout portions 222 is formed to extend in a +Z direction from a −Z-direction-side end side of each of the side plates to the vicinity of a center. Second magnets 620C and 620D described later are arranged on inner surfaces of the long side plates 221A and 221B of the second gimbal frame 220, respectively.

The first gimbal frame 210 and the second gimbal frame 220 have substantially the same shape. The first gimbal frame 210 and the second gimbal frame 220 have the following arrangement structure. Specifically, after the second gimbal frame 220 is rotated about an X axis or a Y axis by 180 degrees and about a Z axis by 90 degrees under a state in which the first gimbal frame 210 and the second gimbal frame 220 are arranged to be directed in the same direction, the second gimbal frame 220 is placed on the first gimbal frame 210 to be combined therewith in such a manner that the cutout portions 222 of the second gimbal frame 220 overlap with the cutout portions 212 of the first gimbal frame 210, respectively. Each of the cutout portions 212 and 222 is formed to have such a depth as to prevent interference between the first gimbal frame 210 and the second gimbal frame 220.

The short side plates 211C and 211D of the first gimbal frame 210 and the long side plates 221A and 221B of the second gimbal frame 220 are connected to each other through intermediation of first gimbal shafts 230A and 230B, each extending along the Y-axis direction, respectively. The short side plates 221C and 221D of the second gimbal frame 220 and the side surfaces 130A and 130B of the camera unit 100 are connected to each other through intermediation of second gimbal shafts 230C and 230D, each extending along the X-axis direction, respectively. A through hole is formed at a center of each of the long side plates 211A and 211B of the first gimbal frame 210. The second gimbal shafts 230C and 230D pass through the through holes so as not to interfere with operations of the second gimbal shafts 230C and 230D.

Thus, the long side plates 211A and 211B of the first gimbal frame 210 are located on an inner side of the short side plates 221C and 221D of the second gimbal frame 220, and are directly opposed to the side surfaces 130A and 130B of the camera unit 100, respectively. Further, the long side plates 221A and 221B of the second gimbal frame 220 are located on an inner side of the short side plates 211C and 211D of the first gimbal frame 210, and are directly opposed to the side surfaces 130C and 130D of the camera unit 100, respectively. Further, the second gimbal frame 220 is tiltable about the first gimbal shafts 230A and 230B, specifically, about the Y axis, with respect to the first gimbal frame 210. The camera unit 100 is tiltable about the second gimbal shafts 230C and 230D, that is, about the X axis, with respect to the second gimbal frame 220.

The power cable 400 is connected to the bottom surface 120 of the camera unit 100. The power cable 400 is configured to supply electric power to the current supply control unit, the recording medium storage portion, and the video image control unit, which are stored in the camera unit 100.

The mounting member 500 includes a bar member 510 and a fixing member 520. One end 510A of the bar member 510 is fixed to the frame body 200, for example, to an outer surface of the short side plate 211D of the first gimbal frame 210. A spherical body 510C is formed at another end 510B of the bar member 510. The fixing member 520 includes a fixing plate 521 and a cylindrical portion 522. The fixing plate 521 has an attachment surface to be attached to, for example, a windshield of a vehicle. The cylindrical portion 522 projects to a side opposite to the attachment surface. The cylindrical portion 522 and the spherical body 510C form a so-called ball joint. The cylindrical portion 522 holds the spherical body 510C in an enclosing manner. The bar member 510 is supported to have a given degree of freedom that allows a direction and an angle thereof to be adjusted with respect to the fixing member 520.

Figure 4:
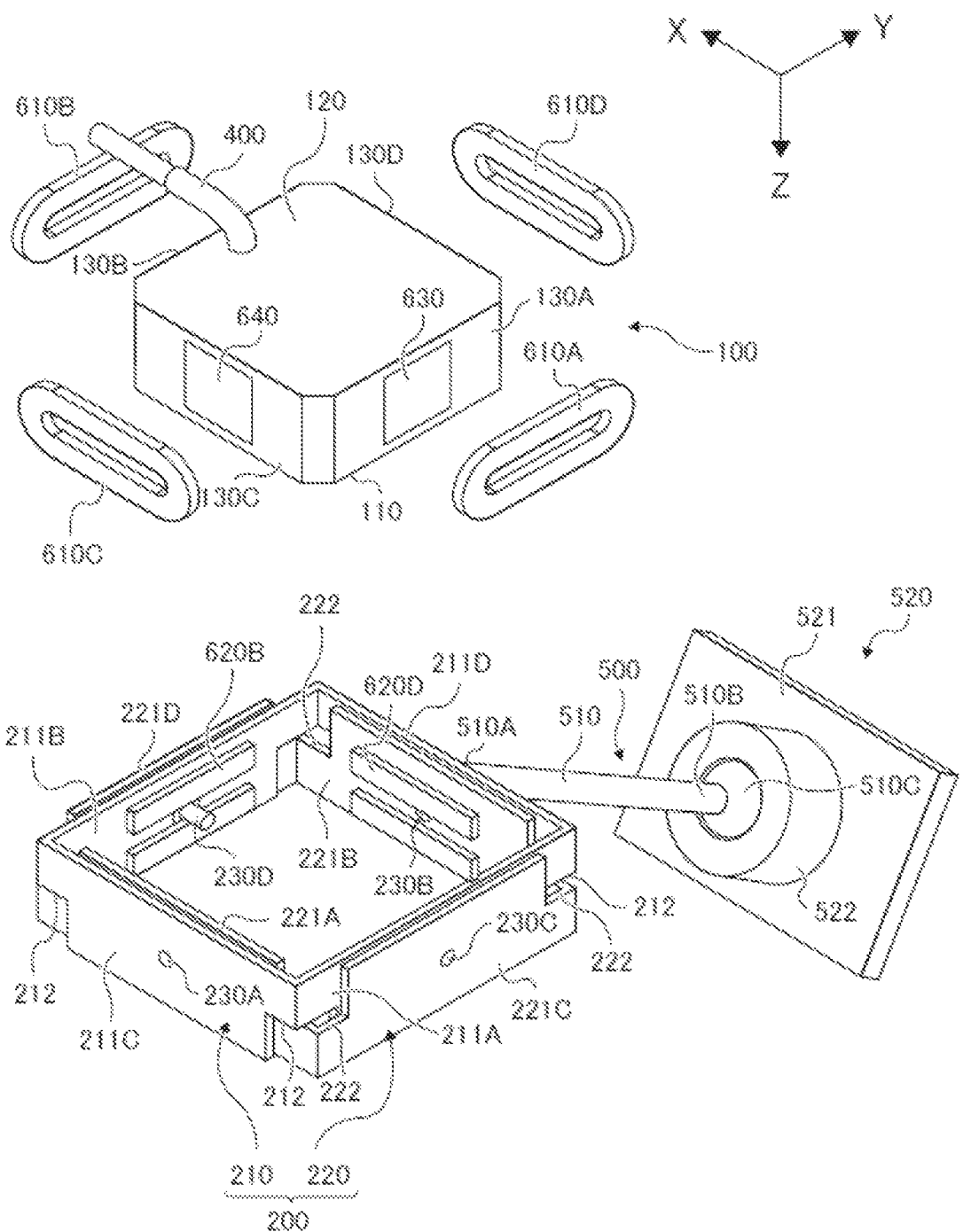
FIG. 4 is an exploded perspective view of the dashboard camera of FIG. 1.

The tilting and driving device 600 includes coils 610 and magnets 620. The coils 610 are arranged on the side surfaces 130A to 130D of the camera unit 100. The magnets 620 are each arranged on the inner surfaces of the long side plates 211A and 211B of the first gimbal frame 210 and the inner surfaces of the long side plates 221A and 221B of the second gimbal frame 220 of the frame body 200. The coils 610 include first coils 610A and 610B and second coils 610C and 610D. The magnets 620 include the first magnets 620A and 620B and the second magnets 620C and 620D. More specifically, the first coils 610A and 610B are arranged on the side surfaces 130A and 130B, each being perpendicular to the X-axis direction, and the second coils 610C and 610D are arranged on the side surfaces 130C and 130D, each being perpendicular to the Y-axis direction. As illustrated in FIG. 4, first yokes 630 each may be embedded in the side surfaces 130A and 130B. Similarly, second yokes 640 each may be embedded in the side surfaces 130C and 130D.

Each of the first coils 610A and 610B has an elliptical overall shape elongated in the Y-axis direction, and includes two linear portions and curved portions. The two linear portions extend in parallel along the Y-axis direction. The curved portions each have a C-like shape, and connect both ends of the linear portions to each other. Similarly, each of the second coils 610C and 610D has an elliptical overall shape elongated in the X-axis direction, and includes two linear portions and curved portions. The two linear portions extend in parallel along the X-axis direction. The curved portions each have a C-like shape, and connect both ends of the linear portions to each other. The first coils 610A and 610B and the second coils 610C and 610D are connected to the current supply control unit (not shown) provided inside the camera unit 100.

Meanwhile, the first magnets 620A and 620B are arranged on the inner surfaces of the long side plates 211A and 211B of the first gimbal frame 210, respectively. The second magnets 620C and 620D are arranged on the inner surfaces of the long side plates 221A and 221B of the second gimbal frame 220, respectively.

Each of the first magnets 620A and 620B includes two plate-shaped magnet pieces, which are each elongated in the Y-axis direction and have surfaces with magnetic polarities different from each other. The two plate-shaped magnet pieces are arranged in alignment with each other in the Z-axis direction. Each of the second magnets 620C and 620D also includes two plate-shaped magnet pieces, which are each elongated in the X-axis direction and have surfaces with magnetic polarities different from each other. The two plate-shaped magnet pieces are arranged in alignment with each other in the Z-axis direction. Thus, the linear portions of the first coil 610A are opposed to the first magnet 620A across a space, and the linear portions of the first coil 610B are opposed to the first magnet 620B across a space. The linear portions of the second coil 610C are opposed to the second magnet 620C across a space, and the linear portions of the second coil 610D are opposed to the second magnet 620D across a space. Each of the first magnets 620A and 620B and the second magnets 620C and 620D may include one magnet piece having surfaces with magnetic polarities different from each other, which are formed by division in the Z-axis direction. In this case, the magnets are opposed to the linear portions of the first coils 610A and 610B and the second coils 610C and 610D across spaces, respectively.

Assembly of the above-mentioned dashboard camera 10 according to the first embodiment is now described. The power cable 400 is connected to the bottom surface 120 of the camera unit 100, and the coils 610 are mounted to the side surfaces 130A to 130D. Further, the magnets 620 are mounted to the inner surfaces of the long side plates 211A and 211B of the first gimbal frame 210 and the long side plates 221A and 221B of the second gimbal frame 220. The second gimbal frame 220 is placed on the first gimbal frame 210 so as to be combined therewith in such a manner that the cutout portions 222 of the second gimbal frame 220 overlap with the cutout portions 212 of the first gimbal frame 210. Further, the short side plates 211C and 211D of the first gimbal frame 210 and the long side plates 221A and 221B of the second gimbal frame 220 are connected to each other through intermediation of the first gimbal shafts 230A and 230B.

Next, the camera unit 100 is inserted into the frame body 200, that is, into the first gimbal frame 210 and second gimbal frame 220. Further, the side surfaces 130A and 130B of the camera unit 100 and the short side plates 221C and 221D of the second gimbal frame 220 are connected to each other through intermediation of the second gimbal shafts 230C and 230D. With the configuration described above, the camera unit 100 is tiltable about the second gimbal shafts 230C and 230D with respect to the second gimbal frame 220, and the second gimbal frame 220 is tiltable about the first gimbal shafts 230A and 230B with respect to the first gimbal frame 210. Specifically, the camera unit 100 is in a tiltable state in the X-axis direction and the Y-axis direction with respect to the first gimbal frame 210.

Further, at this time, the linear portions of the first coils 610A and 610B are opposed to the surfaces of the first magnets 620A and 620B, which have the different magnetic polarities, across the spaces, respectively, under the above-mentioned state. The linear portions of the second coils 610C and 610D are opposed to the surfaces of the second magnets 620C and 620D, which have the different magnetic polarities, across the spaces, respectively, Next, the one end 510A of the bar member 510 of the mounting member 500 is fixed and connected to the short side plate 211D of the first gimbal frame 210 of the frame body 200, and the spherical body 510C formed at the another end 510B is inserted into the cylindrical portion 522 of the fixing member 520.

Next, an operation of the dashboard camera 10 according to the first embodiment is described. For example, a current is supplied from the current supply control unit to energize the coils 610. The current flowing through the coils 610 in a magnetic field generated by the magnets 620 generates an electromagnetic force in the Z-axis direction for the coils 610.

The same current is caused to flow through the first coils 610A and 610B. At this time, forces in the ±Z-axis directions opposite to each other are generated in the first coils 610A and 610B by selecting a direction of the current caused to flow and the magnetic polarities for the surfaces of the first magnets 620A and 620B. As a result, the camera unit 100 can be pivoted about the Y axis.

The same operation is performed for the second coils 610C and 610D. When the same current is caused to flow through the second coils 610C and 610D, forces in the ±Z-axis directions opposite to each other are each generated in the second coils 610C and 610D. As a result, the camera unit 100 can be pivoted around the X axis.

The current supply control unit of the camera unit 100 includes an angular velocity detection device (not shown). When vibration or a shock caused while the vehicle is running is transmitted to the camera unit 100, an angular velocity is detected by the angular velocity detection device as a component about the X axis and a component about the Y axis. The current supply control unit supplies the current to the second coils 610C and 610D and/or the first coils 610A and 610B of the camera unit 100 or adjusts the amount of supply and a direction of the current in accordance with a magnitude and a direction of the detected angular velocity of the component about the X axis and/or the component about the Y axis. In this manner, a force for pivoting the camera unit 100 around the X axis and/or the Y axis is generated, so that the camera unit 100 can be returned to an original direction about the X axis and/or the Y axis. In this manner, the camera unit 100 is isolated from shaking of the vehicle.

The frame 200 may further include a case configured to cover outer sides of the first gimbal frame 210 and the second gimbal frame 220. The first gimbal frame 210 may be fixed to an inner surface of the case, and the mounting member 500 may be mounted to an outer surface of the case. Further, the case may cover ±Z direction-side outer sides of the camera unit 100.

Second Embodiment

Figure 5:
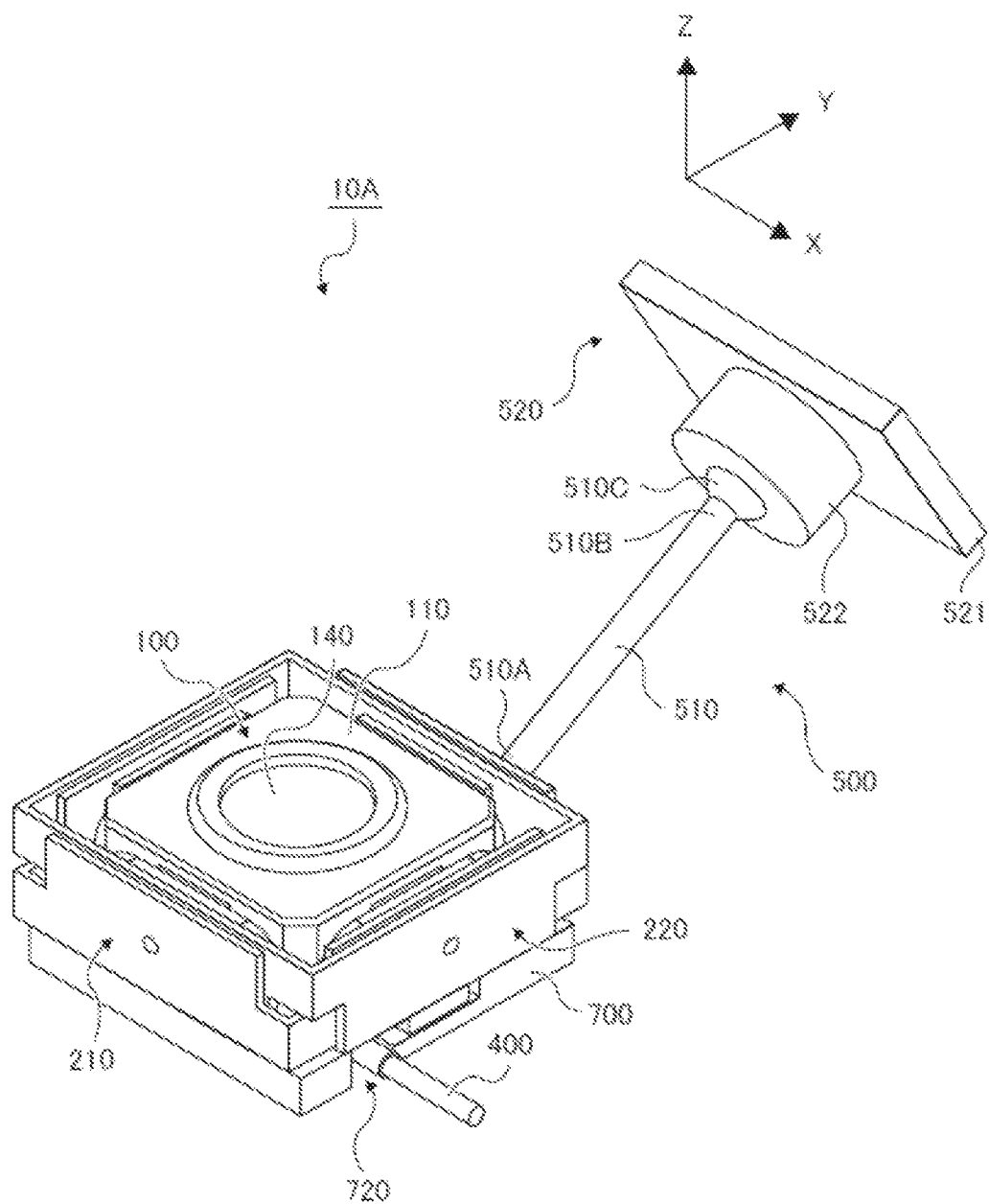
FIG. 5 is an outside perspective view of a dashboard camera according to a second embodiment.
Figure 6:
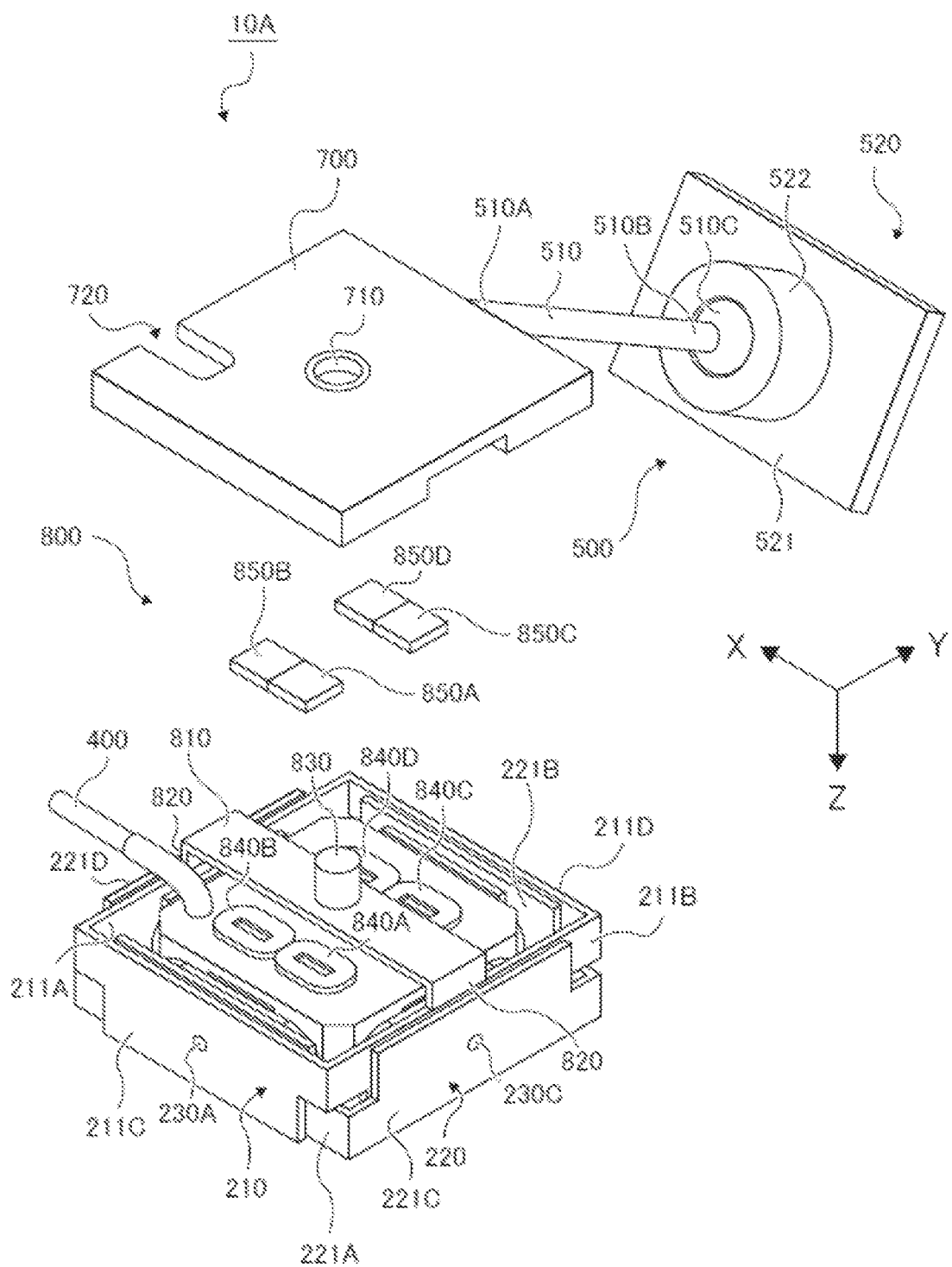
FIG. 6 is an exploded view of the dashboard camera according to the second embodiment, for illustrating differences from the dashboard camera according to the first embodiment.

A dashboard camera 10A according to a second embodiment is described with reference to FIG. 5 and FIG. 6. The dashboard camera 10A according to the second embodiment is different from the dashboard camera 10 according to the first embodiment in that a back plate is provided and the mounting member 500 is mounted to the back plate. The back plate is configured to hold the first gimbal frame 210 in such a manner that the first gimbal frame 210 is pivotable around the Z axis. Further, the dashboard camera 10A is different from the dashboard camera 10 in that third coils are arranged on the bottom surface 120 of the camera unit 100 and third magnets opposed to the back plate are provided. Otherwise, the dashboard camera 10A according to the second embodiment has the same structure as the structure of the dashboard camera 10 according to the first embodiment. In the following description, the same components as those in the first embodiment are denoted by the same reference symbols, and detailed description of the same components is omitted.

The frame body 200 of the dashboard camera 10A according to the second embodiment includes a back plate 700. The back plate 700 is a rectangular flat plate member extending in the X-Y plane direction. The back plate 700 is formed to have an outer shape that is substantially equal to an outer shape of the frame body 200 when viewed in the Z-axis direction. However, the back plate 700 may have another shape. The one end 510A of the bar member 510 of the mounting member 500 is connected to one edge of the back plate 700. A bearing 710 is formed at a center of the back plate 700.

The dashboard camera 10A includes a connecting member 800 configured to connect the first gimbal frame 210 and the back plate 700 to each other. The connecting member 800 includes a flat plate portion 810 having a band-like shape and arm portions 820. The flat plate portion 810 extends in parallel to the bottom surface 120 of the camera unit 100 and the back plate 700. The arm portions 820 are bent at both ends of the flat plate portion 810 to project in the Z-axis direction. A shaft 830 projecting in a direction opposite to a projecting direction of the arm portions 820 is provided at a center of the flat plate portion 810. Distal ends of the arm portions 820 are connected to ends of the long side plates 211A and 211B of the first gimbal frame 210, which are located on a side closer to the back plate 700. The shaft 830 is inserted into the bearing 710 of the back plate 700. With the insertion of the shaft 830, the first gimbal frame 210 is pivotable around the Z axis with respect to the back plate 700.

Four third coils 840A to 840D are fixed onto the bottom surface 120 of the camera unit 100. Meanwhile, third magnets 850A to 850D are arranged on a surface of the back plate 700, which is opposed to the bottom surface 120 of the camera unit 100, in such a manner as to be opposed to the third coils 840A to 840D across a space, respectively.

The power cable 400 is connected to the bottom surface 120 of the camera unit 100 in such a manner as to avoid regions on which the connecting member 800 and the third coils 840A to 840D described above are provided. The back plate 700 has a cable lead-out opening 720 that is formed at a position corresponding to a position at which the power cable 400 is connected to the bottom surface 120 of the camera unit 100. The power cable 400 is led to an outside through the cable lead-out opening 720.

The third coils 840A to 840D are connected to the current supply control unit (not shown) of the camera unit 100. The current supply control unit supplies the same current to the third coils 840A to 840D in accordance with an angular acceleration component about the Z axis, which is detected by an angular acceleration detection device (not shown), or adjusts a direction and the amount of supply of the current. Then, an electromagnetic force for pivoting the camera unit 100 around the Z axis is generated with the current flowing through a magnetic field generated by the third magnets 850A to 850D. As a result, the camera unit 100 can be returned to an original direction about the Z axis.

Additionally, yokes may be provided on the bottom surface 120 of the camera unit 100 in such a manner as to be sandwiched between the bottom surface 120 and the third coils 840A to 840D. Further, the back plate 700 may be provided as a part of a case configured to cover the first gimbal frame 210, the second gimbal frame 220, and the camera unit 100. Still further, the third coils 840A to 840D may be provided to the back plate 700, and the third magnets 850A to 850D may be provided to the camera unit 100. Still further, regarding the number of the third coils 840A to 840D and the third magnets 850A to 8500, at least one set of the third coil and the third magnet is needed to generate a driving force in a tangential direction of a circumference having the shaft 830 as a center.

The embodiments have been described with an example in which the present invention is applied to the dashboard camera. However, the present invention is applicable not only to the dashboard camera but also to, for example, other camera apparatus to be mounted to a bicycle or a drone.

What is claimed is:

1. A biaxial tilting device, comprising:
a frame body provided to be opposed to side surfaces of a member to be tilted across a space; and
a tilting and driving mechanism configured to drive the member to be tilted so as to be tilted,
wherein, in an XYZ orthogonal coordinate system, the frame body includes:
a first gimbal frame opposed to two of the side surfaces of the member to be tilted, each extending in a Y-Z plane direction; and
a second gimbal frame opposed to other two of the side surfaces of the member to be tilted, each extending in an X-Z plane direction, and
wherein the first gimbal frame is coupled to an external member, the second gimbal frame is coupled to the member to be tilted in such a manner as to be tiltable,
wherein each of the first gimbal frame and the second gimbal frame has an oblong shape having long sides and short sides when viewed in the Z-axis direction,
wherein the long sides of the second gimbal frame are located on an inner side of the short sides of the first gimbal frame,
wherein the long sides of the first gimbal frame are located on an inner side of the short sides of the second frame,
wherein inner surfaces of the frame body, which correspond to the long sides of the first gimbal frame and the long sides of the second gimbal frame, are directly opposed to the side surfaces of the member to be tilted, and
wherein the first gimbal frame and the second gimbal frame are coupled to each other in such a manner as to be tiltable.

2. The biaxial tilting device according to claim 1,
wherein the second gimbal frame is coupled to the first gimbal frame through intermediation of first gimbal shafts, each extending along a Y-axis direction, so that the second gimbal frame is tiltable about the first gimbal shafts, and
wherein the other two side surfaces of the member to be tilted are connected to the second gimbal frame through intermediation of second gimbal shafts, each extending along an X-axis direction, so that the member to be tilted is tiltable about the second gimbal shafts.

3. The biaxial tilting device according to claim 2, wherein one of a magnet and a coil, which serves as the tilting and driving mechanism, is arranged on each of the side surfaces of the member to be tilted, and another one of the magnet and the coil is arranged on each of inner surfaces of the frame body including the first gimbal frame and the second gimbal frame, which are directly opposed to the side surfaces of the member to be tilted.

4. The biaxial tilting device according to claim 3, further comprising a turning mechanism configured to pivot the first gimbal frame around the Z axis.

5. The biaxial tilting device according to claim 4, wherein the turning mechanism includes a shaft member, which extends in the Z-axis direction, and is configured to support the first gimbal frame, and a bearing configured to support the shaft member.

6. The biaxial tilting device according to claim 1,
wherein each of the first gimbal frame and the second gimbal frame has cutout portions formed in corners of the oblong shape, and
wherein the second gimbal frame is arranged so as to be inverted by 180 degrees about the X axis or the Y axis and is rotated by 90 degrees about the Z axis from an arrangement in which the second gimbal frame is arranged to be directed in the same direction as a direction in which the first gimbal frame is directed, and is then placed on and combined with the first gimbal frame in such a manner that the cutout portions of the second gimbal frame overlap with the corresponding cutout portions of the first gimbal frame.

7. The biaxial tilting device according to claim 6, wherein one of a magnet and a coil, which serves as the tilting and driving mechanism, is arranged on each of the side surfaces of the member to be tilted, and another one of the magnet and the coil is arranged on each of inner surfaces of the frame body including the first gimbal frame and the second gimbal frame, which are directly opposed to the side surfaces of the member to be tilted.

8. The biaxial tilting device according to claim 7, further comprising a turning mechanism configured to pivot the first gimbal frame around the Z axis.

9. The biaxial tilting device according to claim 8, wherein the turning mechanism includes a shaft member, which extends in the Z-axis direction, and is configured to support the first gimbal frame, and a bearing configured to support the shaft member.

10. The biaxial tilting device according to claim 1, wherein one of a magnet and a coil, which serves as the tilting and driving mechanism, is arranged on each of the side surfaces of the member to be tilted, and another one of the magnet and the coil is arranged on each of inner surfaces of the frame body including the first gimbal frame and the second gimbal frame, which are directly opposed to the side surfaces of the member to be tilted.

11. The biaxial tilting device according to claim 10, further comprising a turning mechanism configured to pivot the first gimbal frame around the Z axis.

12. The biaxial tilting device according to claim 11, wherein the turning mechanism includes a shaft member, which extends in the Z-axis direction, and is configured to support the first gimbal frame, and a bearing configured to support the shaft member.

13. The biaxial tilting device according to claim 1, further comprising a turning mechanism configured to pivot the first gimbal frame around the Z axis.

14. The biaxial tilting device according to claim 13, wherein the turning mechanism includes a shaft member, which extends in the Z-axis direction, and is configured to support the first gimbal frame, and a bearing configured to support the shaft member.

15. A camera device, comprising:
   a camera unit corresponding to the member to be tilted; and
   the biaxial tilting device of claim 1.

16. An electronic apparatus, comprising the camera device of claim 15.

* * * * *